United States Patent [19]

Gehmann

[11] Patent Number: 4,856,879
[45] Date of Patent: Aug. 15, 1989

[54] AIMING DEVICE

[76] Inventor: Walter Gehmann, Karlstrasse 40, 7500 Karlsruhe, Fed. Rep. of Germany

[21] Appl. No.: 26,952

[22] Filed: Mar. 17, 1987

[30] Foreign Application Priority Data

Apr. 22, 1986 [DE] Fed. Rep. of Germany ....... 3623513

[51] Int. Cl.[4] .................. G02B 5/30; G02B 26/02; G02B 27/28
[52] U.S. Cl. .................................. 350/407; 350/266; 350/408
[58] Field of Search ................... 350/407, 408, 266

[56] References Cited

U.S. PATENT DOCUMENTS

| | | | |
|---|---|---|---|
| 3,456,351 | 7/1969 | Gehmann | 350/266 X |
| 3,732,793 | 5/1973 | Tague | 350/407 X |
| 4,392,723 | 7/1983 | Gehmann | 350/407 |

FOREIGN PATENT DOCUMENTS

| | | | |
|---|---|---|---|
| 2007258 | 9/1971 | Fed. Rep. of Germany | 350/407 |
| 2854996 | 7/1980 | Fed. Rep. of Germany | 350/266 |
| 3004635 | 8/1981 | Fed. Rep. of Germany | 350/407 |
| 55-38548 | 3/1980 | Japan | 350/408 |

Primary Examiner—John K. Corbin
Assistant Examiner—David J. Edmondson

[57] ABSTRACT

An aiming device (diopter) has an easily removable eyepiece with adjustable diaphragm mounted on one end of a housing portion which housing portion has a cavity eccentrically formed therein. A color filter disc and two polarizing filter discs are rotatably disposed in the cavity and provided with circumferential gear structures which are in engagement with internal gear structures formed on operating rings extending around the housing portion and the respective discs to move the discs relative to the viewing axis of the aiming device.

9 Claims, 2 Drawing Sheets

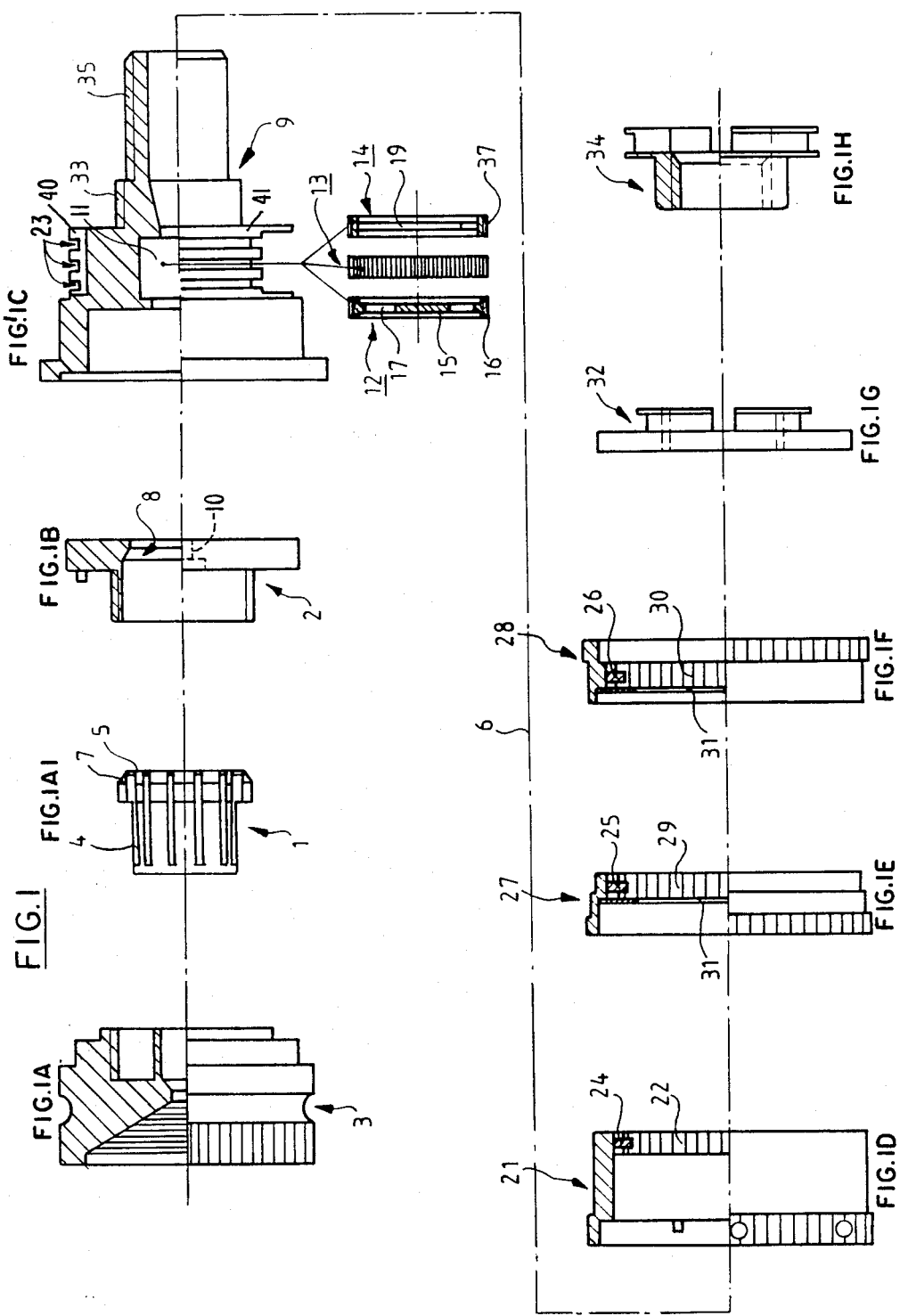

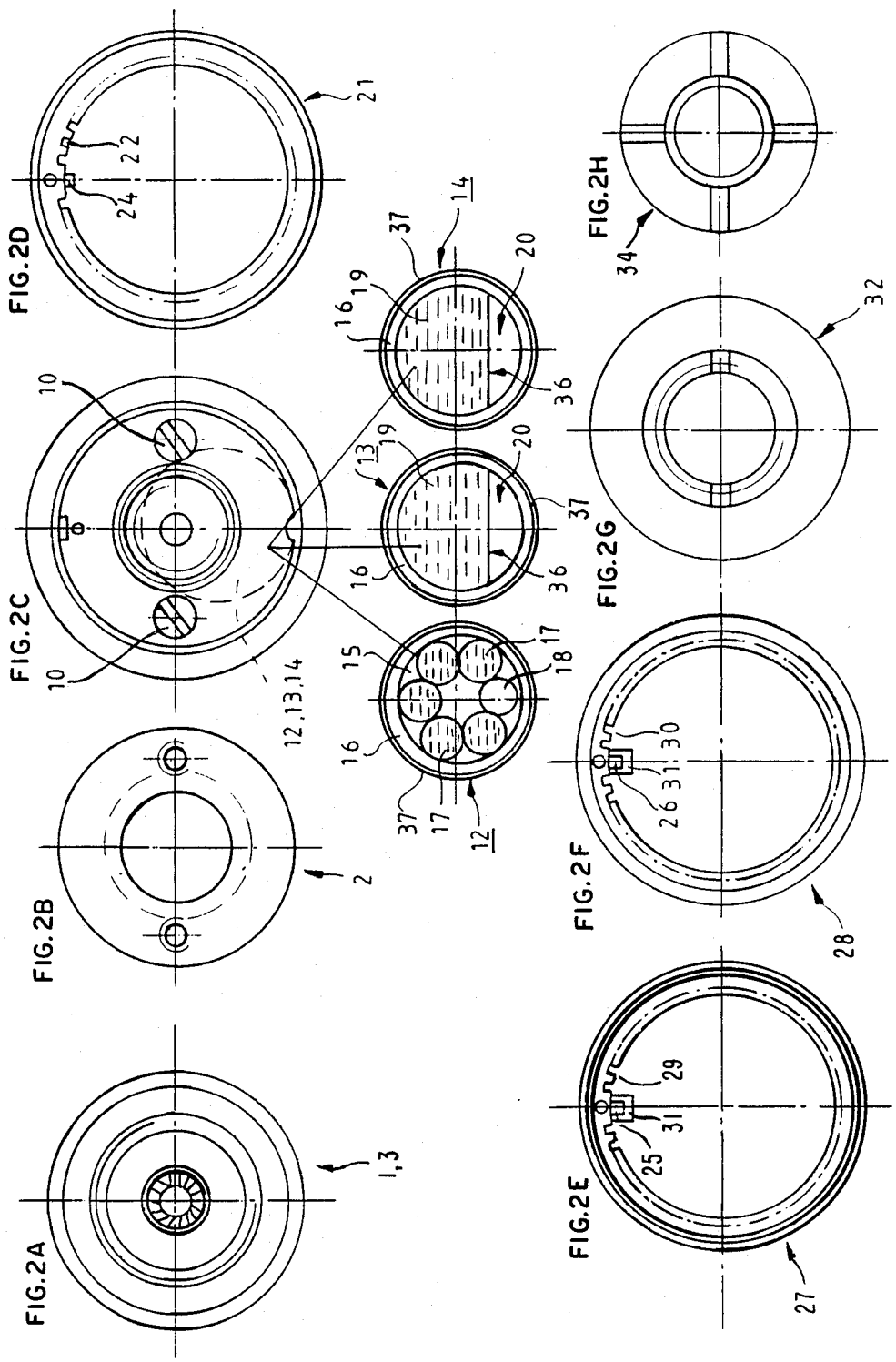

AIMING DEVICE

BACKGROUND OF THE INVENTION

The invention relates to an aiming device, that is, a diopter, with a tubular housing portion and with an eyepiece including a diaphragm formed by an axially slotted sleeve member providing lamellas with free end portions bent inwardly toward the diopter axis so as to define the diaphragm opening. The inwardly bent end portions of the lamellas extend normal to the diopter axis and are disposed in overlapping relationship. They are arranged with their outer edge in engagement with a conical section of the eyepiece housing into which the sleeve member may be forced by means of a hollow, knurled screw member which is screwed into the eyepiece housing, the eyepiece housing being mounted to the diopter housing. The housing portion also contains a polarization filter consisting of two polarizing discs disposed adjacent one another and being rotatable relative to one another by 90° by means of knurled rings and it further contains a color filter consisting of a disc rotatable by another knurled ring and including a plurality of different color filters wherein the knurled screw member and the knurled rings all have about the same outer diameter and are arranged coaxially with respect to the tubular housing portion in such a manner that the knurled rim areas project only slightly from the tubular housing portion. Such a diopter sight with integral eyepiece, color and polarizing filters is known for example from Applicant's earlier U.S. Pat. No. 4,392,723 which issued July 12, 1983.

This sight provides for a combination diopter which permits not only for adjustment of the diaphragm by way of an annular knurled screw surrounding a tubular diaphragm housing but also for the setting of the polarization filter discs and the selection of the color filters as desired by the operator or the hunter, all by the same type of operating mechanism. This arrangement has the advantage that the hunter can change the setting of the diaphragm and of the polarizing filter as well as the color filters all in the same manner while he is aiming essentially without a change in his hand position. Also such an aiming device is very compact, short and light so that the recoil forces have little effect on the device and alignment errors remain within acceptable limits.

The prior art includes also aiming devices without a housing portion as it is known from the patent just described. Rather those prior art arrangements utilize separate parts, that is, eyepieces, polarizing filters and color filters, which are placed next to, and screwed to, one another. Such a device however is not only quite long so that component alignment errors are more seriously affecting the device's performance but the device is also much more difficult to handle and to adjust as the position of the operator's hand must be changed for the various adjustments.

The aiming device described in U.S. Pat. No. 4,392,723 has proved itself extraordinarily well, but the owners find it disadvantageous that they cannot clean it themselves. Since all the components are firmly mounted within a tubular housing, adjustment of the components is permanent and the device is very compact but servicing procedures are quite involved and cannot be performed by a normal owner since reliable performance cannot be expected after servicing of such a device by a layman. This is especially true with regard to the polarizing filter whose filter plates are mounted on support arms which can be pivoted relative to one another and together out of the center of the light passage. The arrangement requires a combination of the two filter plates with the operating arms which prevents cleaning of the polarizing filter plates. In addition, also the eyepiece and the color filter are not easily accessible for cleaning.

It is also considered to be a disadvantage that, if the polarizing filter is pivoted to its operating position in the line of sight, there are necessarily two filter plates in place which darken the view even if both are arranged in the same direction of polarization.

Finally, it is pointed out that the prior art arrangement does not lend itself well to automatic assembly, that is, to economic assembly in large numbers.

It is the object of the present invention to provide an aiming device which can be manufactured economically but which is still compact, that is, a device in which the eyepiece and the various filters are disposed closely adjacent one another and still is provided with the knurled operating rings disposed around the tubular housing but which, nevertheless, can be easily disassembled for cleaning and again assembled by the owner.

SUMMARY OF THE INVENTION

In an aiming device consisting of a housing portion with an easily removable eyepiece including an adjustabe diaphragm mounted to one end thereof, the housing portion has a cavity eccentrically formed therein which cavity receives a color filter disc and two polarizing filter discs. The discs are disposed in the cavity adjacent, and rotatable relative to, one another and are provided with circumferential gear structures which are in engagement with internal gear structures formed on operating rings that extend around the housing portion and the respective discs to permit rotation of the discs by the operating rings thereby to move the disc positions relative to the viewing axis of the device, the operating rings being held in position by retaining means removably mounted on the other end of the housing portion.

In the arrangement according to the invention, the diopter components are not firmly mounted in the housing portion of the diopter as they are in the arrangement according to U.S. Pat. No. 4,392,723 but the housing portion receives only the polarizing filters and the color filter whereas the adjustable diaphragm is screwed to the housing portion. Nevertheless, the diaphragm is disposed closely adjacent one of the filters both of which are also disposed closely adjacent one another such that the diopter according to the invention is even shorter than that described in U.S. Pat. No. 4,392,723. Furthermore the diaphragm is operable in the usual manner by way of a knurled screw which is arranged coaxial with the center portion and also the various filters can be operated in a convenient manner, all by knurled rings of essentially the same diameter which extend around the housing providing for neat appearance of the diopter. In order to eliminate the disadvantage of always having two polarizing filters disposed in the light path through the diopter, the arrangement according to the invention utilizes polarizing filter disc segments, that is, circle segments are cut from the filter discs in such a manner that the straight cutting edge is disposed outside the largest diameter of the eyepiece of the diopter if the filter discs are rotated to the appropriate positions, that is, the distance of the chord defined by the cutting edge from the circumference of the disc circle is larger than the largest diameter of the eyepiece.

With this arrangement one of the polarizing filter disc segments may be rotated to a position in which it is out of the light path, that is, the light path extends through the cut-off area whereby only one of the polarizing discs is in the light path of the diopter. If the second polarizing disc is rotated to the same position, there is no polarizing filter disc area in the diopter light path.

The arrangement according to the invention however provides for an additional extraordinary advantage because, with a single polarizing filter disc pivoted into the light path, such filter disc may be so oriented that reflections otherwise appearing in the field of view can be eliminated. This is possible because, in contrast to other polarizing filter arrangements, the direction of polarization of the polarizing filters may be adjusted to the particular local circumstances, that is, the direction of polarization may be so adjusted that the objectionable light of reflecting objects or other light sources which oscillates in a particular plane is eliminated or at least dampened to such a degree that it no longer disturbs the hunter. The second polarizing filter may additionally be rotated to any desired position such that the amount of light passing through the diopter is adjusted to any level as desired by the hunter. Glaring light reflections which may affect the hunter's ability to clearly recognize the aim are therefore avoidable, that is, aim recognition is clearly facilitated.

It is also pointed out that, with the arrangement according to the invention, the adjustable diaphragm including the eyepiece housing, the slotted sleeve disposed in the eyepiece housing and the knurled screw screwed into the eyepiece housing can easily be removed from the housing portion for cleaning by the owner. Also the various filter discs can easily be cleaned and also the housing portion itself since the various filter discs are only placed into the circle segment-shaped cavity of the housing portion and are not retained in those cavities by any type of components so that they can be taken out for cleaning. In order to insure that they are repositioned in the proper order, the filter discs and the knurled rings and the respective positions in the housing portion may be appropriately marked.

In order to facilitate handling of the relatively small filter discs there are provided in accordance with a further embodiment of the invention receptacles in the circle segment-shaped cavity of the housing portion which are pivotable about an axis extending along the outer edge of the center portion and which receive the filter discs which, as a result, can easily be pivoted out of the cavity in the housing portion for cleaning.

Preferably, the gear structure of the discs is provided on outer collars which project axially slightly beyond the polarizing discs and beyond the color filters so that the discs may be disposed closely adjacent one another within the cavity of the center portion without subjecting the polarizing filters or the color filters to any chances of being scratched. Preferably, the color filter disc is a circular plate with an outer collar provided with a gear structure and having bores receiving color discs which, on both sides, project above the surfaces of the circular plate. This greatly facilitates cleaning of the color filter disc surfaces as no dirt can collect at the outer surface areas of the filter discs as it is normally possible when the filter discs are mounted recessed in the support plate, that is, the sight through the discs is not obstructed by dirt and dust collected at the disc edges. Between the discs, thin plastic slip washers are preferably provided which not only facilitate relative rotation between the discs but which also provide for sufficient distance between the components to avoid undesired engagement of inner gear structures of the operating rings with the outer gear structure of the inappropriate filter discs.

Preferably, the housing portion is provided with circumferential guide grooves receiving pins projecting from the knurled operating rings. The pins provide appropriate guidance for the operating rings and limit rotation thereof by way of stop members disposed in the grooves.

SHORT DESCRIPTION OF THE DRAWINGS

FIG. 1 is an exploded view of the components of the diopter, the components being shown partially in section and being marked FIG. 1A, FIG. 1A1, FIG. 1B, FIG. 1C, FIG. 1C receiving components 12, 13 and 14, and FIG. 1C3, FIG. 1D, FIG. 1E, FIG. 1F, FIG. 1G and FIG. 1H ; and FIG. 2A, FIG. 2B, FIG. 2C receiving components 12, 13 and 14, and FIG. 2D, FIG. 2E, FIG. 2F, FIG. 2G and FIG. 2H are front views of the respective components shown in the order established in FIG. 1.

DESCRIPTION OF A PREFERRED EMBODIMENT

The adjustable diaphragm includes an axially slotted sleeve 1, an eyepiece housing 2 and a knurled screw 3 adapted to be screwed into the eyepiece housing 2. The slotted sleeve 1 includes separate lamellas 4 whose free ends 5 are bent inwardly toward the center line 6 so as to extend in a plane normal to the center line 6 and overlap one another like scales. The bentover edges 7 of the lamellas 4 are disposed so as to be engaged by the surface of a conical restriction 8 of the eyepiece housing 2 when the eyepiece is assembled, such that the cage formed by the lamellas is more or less compressed when the knurled screw 3 is screwed into the eyepiece housing 2 for adjustment of the size of the diaphragm opening.

The adjustable diaphragm eyepiece formed by the assembly of components 1, 2 and 3 is then placed on the front end of the housing portion 9 and is fastened thereto by means of screws 10.

The housing portion 9 has a cavity 11 in the cross-sectional shape of a circle segment adapted to receive the filter discs 12, 13, 14. The filter disc 12 contains the color filters and the filter discs 13 and 14 are polarizing filters. The color filter disc 12 is a circular plate 15 with an outer collar 16, the plate 15 having openings into which the color filters 17 are fitted. One of the openings 18 is void of a filter, that is, it remains free from any obstructions to the passage of light. The other two filter discs 13, 14 comprise polarizing foils or plates 19 each being provided with a cut-out 20 in the form of a circle segment.

After insertion of the filter discs 12, 13, 14 into the cavity 11 in the housing portion 9 a knurled color filter operating ring 21 is slipped onto the housing portion 9, which knurled ring 21 is provided with an internal gear structure 22 such that its internal gear structure 22 engages a corresponding spur gear structure formed on the collar 16 of the color filter 12. The center portion 9 has circumferential guide grooves 23 receiving pins 24 of the knurled color filter operating ring 21 and the pins 25, 26 of the knurled polarizing filter operating rings 27, 28. An axial slot 40 is formed in the center portion 9 so as to intersect the circumferential grooves 23 to permit installation of the operating rings 21, 27, 28 with the pins 24, 25 and 26 projecting inwardly therefrom. Also the polarizing filter operating rings 27 and 28 are provided with internal gear structures 29, 30 for engagement with the corresponding spur gear structures 37 of the polarizing filter discs with which they are engaged when slipped onto the housing portion 9 next to the knurled color filter operating ring 21. In order to facilitate rotation of the operating rings relative to one another and in order to maintain some clearance between the gear structures of the operating rings, slip washers 31 are arranged between the operating rings 21, 27 and 28. After positioning of the operating rings 21, 27, 28 on the center portion 9 and around the color and polarizing filter discs 12, 13, 14, a retainment disc 32 is screwed onto a threaded collar 33 of the center portion 9 and finally an adjustment ring 34 is screwed onto the end of the center portion 9 which end is provided with a corresponding thread 35. Finally, in order to further facilitate removal and installation of the discs 12, 13, 14, a receptacle 41 may be disposed in the cavity 11 with the discs being received in the receptacle so that the relatively small discs can be more easily grasped.

It is now apparent that the diopter according to the invention can be easily disassembled as far as necessary to facilitate cleaning of the filter discs: It is only necessary to remove the operating rings in order to remove or tilt out the filter discs for cleaning. Even a hunter without mechanical inclinations can easily disassemble and clean the filter surfaces and thereafter reassemble the few components. It is also pointed out that all components and cavities are circular in shape so that all parts can be easily and economically manufactured. The arrangement is very simple, neat in appearance and easy to assemble.

What is claimed is:

1. An aiming device comprising: a tubular housing portion, an eyepiece containing an adjustable diaphragm mounted onto said housing portion from one axial end thereof, said housing portion having formed therein at the other axial end thereof a partially annular cavity arranged eccentrically so as to be open at one side, a color filter disc and two polarizing filter discs disposed in said cavity side by side so as to permit their rotation relative to one another within said cavity and having a diameter so as to be essentially tangential to a circle defined by the part of the tubular housing portion in which said discs are disposed, an operating ring for each of said discs disposed around said tubular housing portion from said other axial end thereof and receiving therein the respective disc, each of said discs having a circumferential gear structure and each of said rings having an internal gear structure in engagement with the exposed side of the associated disc and in engagement with the circumferential gear structure thereon for rotating said discs as desired, the tubular housing portion defining said cavity having partially circular guide grooves formed in the outer surface thereof in planar alignment with said discs and said operating rings having inwardly projecting pins received in said grooves for engaging said operating rings in position and said tubular housing portion having an axial slot intersecting said guide grooves, said axial slot being adapted to accommodate said projecting pins during mounting of said operating rings and said guide grooves further including stop members adapted to limit rotational movement of said operating rings and said discs to a desired angle and removable means for retaining said operating rings in their engaged positions around said housing portion.

2. An aiming device according to claim 1, wherein said discs are provided with collars which carry said circumferential gear structures.

3. An aiming device according to claim 2, wherein said discs are in contact with one another by way of said collars.

4. An aiming device according to claim 1, wherein said polarizing filters are disc segments with a circle segment area eliminated at one side of each disc to such an extent that, with said circle segment are rotated fully into the housing center portion, the axial projection of the largest eyepiece opening extends through said area to provide an unobstructed vision path.

5. An aiming device according to claim 1, wherein said collars are of greater axial width than said filter discs.

6. An aiming device according to claim 1, wherein said color filter disc consists of a circular plate having an outer collar provided with said circumferential gear structure, said plate having openings in which color filters are fitted, said color filters being of larger width than said plate but of smaller width than said collar.

7. An aiming device according to claim 1, wherein a retainer is disposed in said cavity in the center portion and said filter discs are disposed in said container such that upon removal of said operating rings said discs are pivotable out of said cavity within said retainer.

8. An aiming device according to claim 1, wherein slide washers of plastic material are disposed between adjacent operating rings.

9. An aiming device according to claim 1, wherein said eyepiece comprises a housing enclosing a diaphragm consisting of a sleeve which is axially slotted so as to form lamellas projecting from one end of said sleeve and having radially inwardly bent free ends projecting toward the center line of said eyepiece and overlapping scale-like thereby defining an opening in the center thereof, said diaphragm housing having a conical inner end surface area against which the bent edge sections of said lamellas abut and a tubular knurled screw threaded into said housing so as to engage said slotted sleeve for forcing said lamellas into the narrowing opening defined by said conical surface area to resiliently compress said lamellas for adjustment of the size of said diaphragm opening.

* * * * *